C. WINKLER.
DUST COLLECTOR.
APPLICATION FILED JUNE 8, 1908.

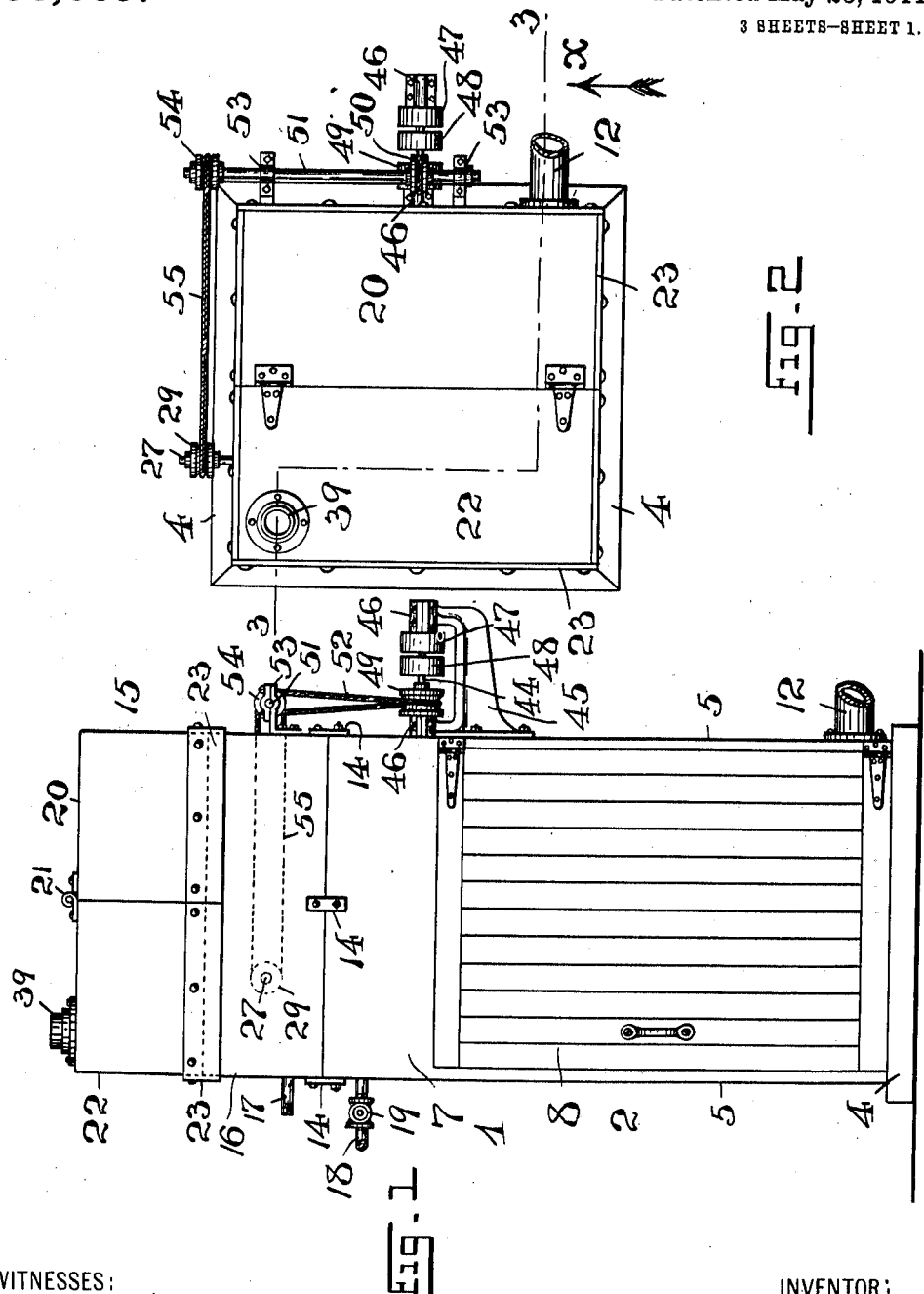

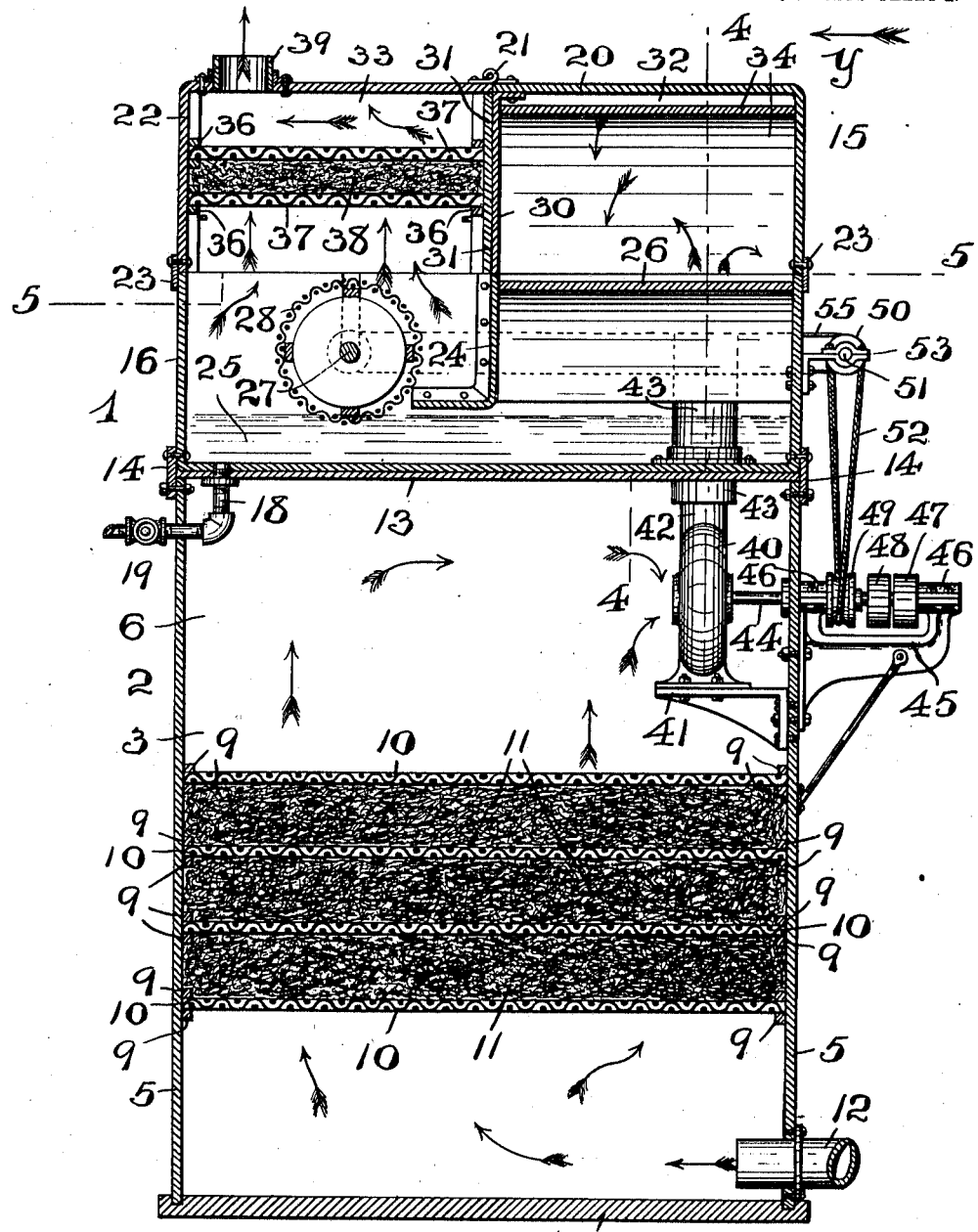

993,009.

Patented May 23, 1911.
3 SHEETS—SHEET 3.

WITNESSES:

INVENTOR:
Carl Winkler;
BY
Fraentzel and Richards
ATTORNEYS.

UNITED STATES PATENT OFFICE.

CARL WINKLER, OF NEWARK, NEW JERSEY.

DUST-COLLECTOR.

993,009. Specification of Letters Patent. Patented May 23, 1911.

Application filed June 8, 1908. Serial No. 437,246.

*To all whom it may concern:*

Be it known that I, CARL WINKLER, a citizen of the United States, residing at Newark, in the county of Essex and State of New Jersey, have invented certain new and useful Improvements in Dust-Collectors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to that class of apparatus known in the art as dust-collectors; and, the present invention has reference, more particularly, to a novel dust-collector, which also serves as an air-purifier.

My present invention has for its principal objects to provide a novel apparatus which is especially adapted for use in factories and such other places, where the air is laden with flying particles of dust and other impurities, the dust-laden air being drawn by suction into the apparatus and through means therein for separating, at different points within the apparatus, the coarser and finer particles of foreign matter and dirt contained in the air.

The invention has for its further object to provide a simply constructed and efficiently operating apparatus or device which furnishes pure air, by removing all dust and impurities therefrom, and which is especially adapted for use in the factories of jewelers for the separation and collection of the fine particles of gold from the air in such places; and, furthermore, to provide a simple and convenient construction, in which the various devices and parts are easily accessible for the removal of the collecting screens.

Other objects of this invention not at this time more particularly mentioned will be clearly understood from the following detailed description of the same.

With the various objects of my present invention in view, the said invention consists, primarily, in the novel dust-collector and air-purifier hereinafter set forth; and, the invention consists, furthermore, in the novel arrangements and combinations of the various devices and parts, as well as in the details of the construction of the same, all of which will be hereinafter more fully set forth in the following specification, and then finally embodied in the clauses of the claim which are appended to and which form an essential part of this specification.

The invention is clearly illustrated in the accompanying drawings, in which—

Figure 4:
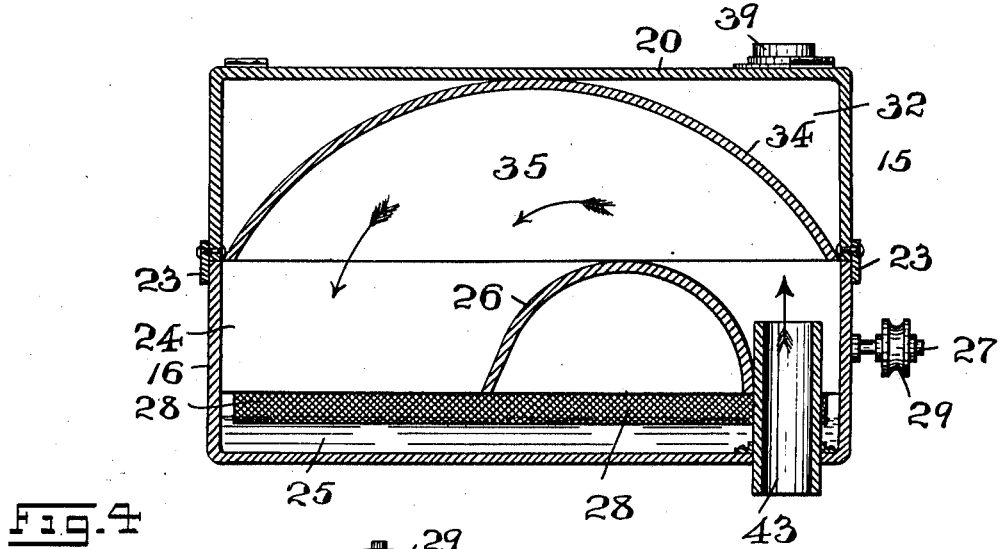
Figure 5:
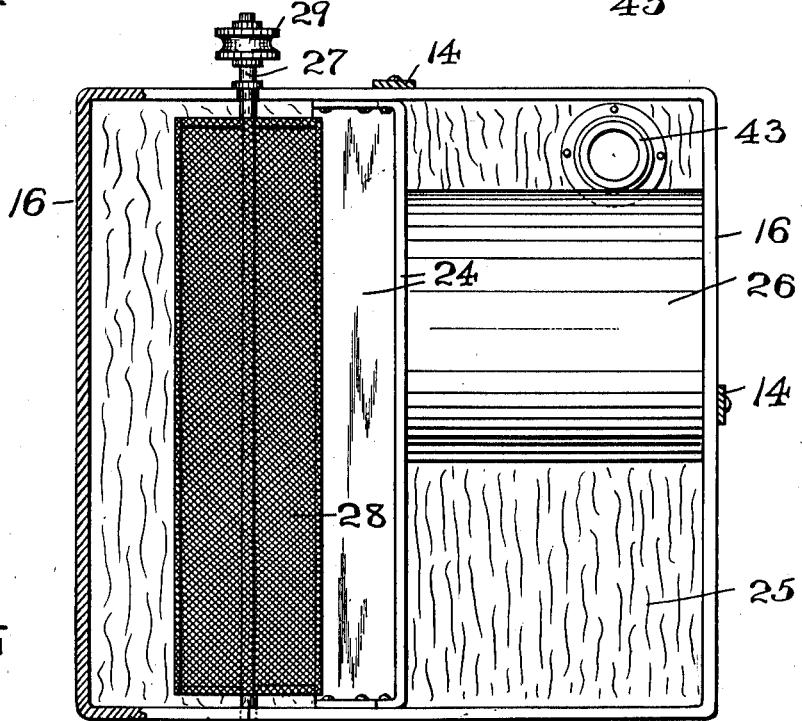

Figure 1 is a front elevation of a dust collector and air-purifier embodying the principles of the present invention; and Fig. 2 is a top or plan view of the same. Fig. 3 is a transverse vertical section taken on line 3—3 in said Fig. 2, looking in the direction of the arrow $x$, said section being made on an enlarged scale. Fig. 4 is a transverse vertical section of the upper portion of the apparatus, said section being taken on line 4—4 in Fig. 3, looking in the direction of the arrow $y$; and Fig. 5 is a horizontal section taken on line 5—5 in said Fig. 3.

Similar characters of reference are employed in all of the above described views, to indicate corresponding parts.

Referring now to the accompanying drawings, the reference-character 1 indicates a complete apparatus showing one embodiment of my present invention, and the same comprises a lower box or cabinet 2, forming a suitable chamber or compartment 3. The said box or cabinet consists, essentially, of a base 4, preferably of a rectangular shape, and its sides 5, back 6, and front 7. The front is made with an opening which is adapted to be closed by means of a suitably hinged door 8, substantially as shown in Fig. 1 of the drawings. Suitably secured upon the inner surfaces of the sides 2 are cleats 9, upon which are removably arranged suitably formed screens 10, the said screens being arranged preferably in the manner shown in Fig. 3 of the drawings, and having the spaces between the said screens filled or packed with a suitable dust-collecting material 11, which is adapted to successfully strain out from the currents of air passing through the same, the larger and coarser particles of dust and other foreign matter sucked into the compartment 3 from the room or other place in which the apparatus is installed, into and through an inlet or suction-pipe or duct 12, extending through one of the sides in the lower portion of the apparatus.

Suitably mounted upon the upper portion or top 13 of the lower box or cabinet 2, by means of holding or fastening members 14, or in any other suitable manner, is a suitable receptacle or upper cabinet 15. This receptacle or cabinet, it will be noticed from Figs. 1, 3 and 4 of the drawings, consists of a lower tank-like member or element 16, adapted to contain water which can be admitted into the same through an inlet pipe 17, and drawn out therefrom through a pipe 18 which is preferably provided with a closing cock or valve 19, substantially as shown. Suitably mounted upon the upper open portion of the said tank-like member or element 16 is an upper box-shaped portion or element 20, the said member or element 20 being usually made in two sections, which are connected by means of hinges, as 21, so that the section 22 may be raised and the one-half of the said box-shaped portion or element opened, as will be clearly evident. The said two hinged sections of the upper box-shaped portion are preferably surrounded around their lower marginal edge-portions by means of a downwardly extending flange or valance 23 which embraces the upper portion of the tank-like member or element 16, substantially in the manner shown in the several figures of the drawings, and thereby porvides a dust-proof joint between said two portions or elements 16 and 20. The interior of the said tank-like member or element 16 is divided by means of a suitably secured vertical partition 24, the lower edge-portion of which terminates slightly above the surface of the body of water 25 contained in said member or element 16. Extending laterally across that portion of the chamber formed by one of the sides of the member or element 16 and the said partition or wall 24, is a curved member 26, preferably of the curvature shown in Fig. 4 of the drawings and located near one side of the said compartment or chamber, as illustrated in said Fig. 4, and in Fig. 5. Within the other chambered portion of the said tank-like member and extending from front to rear of the same, is a suitable shaft 27 upon which is disposed a rotary screen 28, and upon the free end-portion of said shaft is a suitable driving-pulley 29.

The two sections 20 and 22 comprising the upper box-like member or element are separated by a double partition 30 and 31, as clearly shown in Fig. 3 of the drawings, so as to provide the said upper box-like member or element with two separate compartments or chambers 32 and 33, substantially as shown. Within the said compartment 32 is arranged a curved member 34, substantially in the manner illustrated in Figs. 3 and 4 of the drawings, the said curved members 26 and 34 being disposed in such a manner, so as to provide a curved duct or passage-way 35 which is of a smaller cross-sectional area at the one end, forming the inlet, and at its other end forms the outlet, all of which is clearly illustrated in the said Fig. 4 of the drawings.

Within the chamber or compartment 33, I have preferably arranged any suitable number of cleats 36, between which are disposed suitably constructed screens or sieves 37, and arranged in the space between the said screens or sieves 37, there may be a suitable dust-collecting material, as 38. An outlet duct or pipe, as 39, is suitably arranged and secured upon the upper surface of the said section 22, and the said pipe or duct 39 is in communication with the chamber 33, and is for the purpose of conveying the air to any suitable point outside of the apparatus, as may be desired.

Within the upper portion of the chamber or compartment 6 is a suitable suction blower or fan 40, the same being suitably disposed upon a bracket or support, as 41, extending from the inner side of the lower cabinet 2, substantially as shown in Fig. 3 of the drawings, and the outlet-nozzle 42 being connected with a suitably formed duct or pipe 43 which extends in an upward direction through the upper portion 13 of the cabinet and the bottom of the tank-like member or element 16, and terminates in the inlet of the duct or passage-way 35, which is formed by the curved shells or members 26 and 34, and all of which will be clearly evident from an inspection of Fig. 4 of the drawings.

As shown in Fig. 3 of the drawings, the shaft 44 of the suction blower 40 or fan extends through one of the sides of the lower box or cabinet 2, and is rotatably mounted in a pair of bearings 46 of a bracket 45 which is attached upon the outer side of said lower box or cabinet 2. The said shaft 44 is also provided with a loose pulley 47 and a fast pulley 48, or other suitable means for driving said shaft. Another pulley 49 is arranged upon said shaft 44 for driving a pulley-wheel 50 which is mounted upon a counter-shaft 51, by means of a belt or other suitable connection 52. The said shaft 51 revolves in bearings 53 and is provided with another pulley-wheel 54, over which and the pulley-wheel 29 moves a suitable belt 55, or other suitable connection, for revolving the shaft 27 and the rotary screen or sieve 28 thereon from the said counter-shaft 51, as will be clearly understood.

Having thus described one general arrangement and combination of devices and parts embodied in the form of a dust-collector and air-purifier made according to the principles of my present invention, I will now briefly set forth the manner of using the same for separating the particles of dust, dirt, and other foreign matter and impurities from the air which is taken in at the bottom through the inlet or duct 12. The exhaust fan, and the rotary screen being set in operation, it will be clearly seen, that a suction of air currents is produced in the direction of the arrows shown in the figures of the drawings from the lower portions of the box or cabinet 2, into and through the separating screen and the material placed therebetween, to the upper portions of the said box or cabinet 2 directly into the inlet in the side of the casing which surrounds the fan or blower. The air currents are forced through the outlet 42 of the fan or blower, into the pipe or duct 43, from which the said currents pass into the inlet or contracted portion of the curved duct or passageway 35, so as to be caused to strike the upper surface of the body of water placed beneath the enlarged or outlet portion of the said curved duct 35. The arrangement of the rotary screen is such that its sievelike or screen-surface moves slightly beneath the surface of the water and is thereby constantly kept moist, whereby any particles of dust carried with the air current from the duct 35, and directly beneath the partition 24 will strike the moistened surface of the rotating screen, so that any particles of dust or other foreign matter which may not have been separated from the air during the passage of the latter through the screens 10 and the material 11, will attach themselves to the revolving screen 28. The air finally passes in an upward direction into the chamber 33 and through the screens or sieves 37, and the material 38 therebetween, where any particles of dust, dirt, and the like, which may not have been separated from the air, will be finally removed from the air and collected in the screen 37 and its material 38.

From the foregoing description of my present invention, it will be clearly evident that I have provided a simply constructed and efficiently operating apparatus for the purposes stated, and the movable parts of which can be operated at a slight cost and expenditure of power. I am aware that changes may be made in the arrangements and combinations of the devices and parts without departing from the scope of my present invention as described in the foregoing specification, and as defined in the appended claims. Hence I do not limit my invention to the exact arrangements and combinations of the devices and parts as set forth in the foregoing description of the apparatus, nor do I confine myself to the exact details of the constructions of the various parts as illustrated in the accompanying drawings.

I claim:—

1. A dust collector comprising a lower chambered body provided with an air inlet, means for drawing air into said body, a screening device in said body through which the air is drawn, a tank shaped member mounted upon said body, said member being adapted to contain water, a dividing partition within said member, curved elements also within said member providing an air-conveying duct upon one side of said partition, and a dust collecting filter upon the other side of said partition.

2. A dust collector comprising a lower chambered body provided with an air inlet, a blower within said body, a screening device in said body through which air is drawn, a tank shaped member mounted upon said body, said member being adapted to contain water, an air duct leading from said blower to a point above the surface of the water, a dividing partition within said member, curved elements also within said member providing an air conveying duct upon one side of said partition, and a dust collecting filter upon the other side of said partition.

3. A dust-collector comprising a lower chambered body provided with an air-inlet, means for drawing air into said body, a screening device in said body through which the air is drawn, a tank-shaped member mounted upon said body, said member being adapted to contain water, a dividing partition within said member, curved elements also within said member providing an air-conveying duct upon one side of said partition, and a rotary dust-collecting screen upon the other side of said partition.

4. A dust-collector comprising a lower chambered body provided with an air-inlet, means for drawing air into said body, a screening device in said body through which the air is drawn, a tank-shaped member mounted upon said body, said member being adapted to contain water, a dividing partition within said member, curved elements also within said member providing an air-conveying duct upon one side of said partition, and a rotary dust-collecting screen upon the other side of said partition, and a second stationary screen located above said rotary screen, substantially as and for the purposes set forth.

5. A dust-collector comprising a lower chambered body provided with an air-inlet, means for drawing air into said body, a screening device in said body through which the air is drawn, an upper cabinet mounted upon said body, said upper cabinet comprising a lower tank-shaped element, and an upper element, said upper member consisting of a fixed section and a second section hinged to said fixed section, said tank-shaped element being adapted to contain water, curved elements within said fixed section providing an air-conveying duct, and a dust-collecting screen located beneath said hinged section.

6. A dust-collector comprising a lower chambered body provided with an air-inlet, means for drawing air into said body, a screening device in said body through which the air is drawn, an upper cabinet mounted upon said body, said upper cabinet comprising a lower tank-shaped element, and an upper element, said upper member consisting of a fixed section and a second section hinged to said fixed section, said tank-shaped element being adapted to contain water, curved elements within said fixed section providing an air-conveying duct, and a rotary dust-collecting screen located beneath said hinged section.

7. A dust-collector comprising a lower chambered body provided with an air-inlet, means for drawing air into said body, a screening device in said body through which the air is drawn, an upper cabinet mounted upon said body, said upper cabinet comprising a lower tank-shaped element, and an upper element, said upper member consisting of a fixed section and a second section hinged to said fixed section, said tank-shaped element being adapted to contain water, curved elements within said fixed section providing an air-conveying duct, and a rotary dust-collecting screen located beneath said hinged section, and a second stationary screen located above said rotary screen, substantially as and for the purposes set forth.

8. A dust-collector comprising a lower chambered body provided with an air-inlet, a blower within said body, a screening device in said body through which air is drawn, a tank-shaped member mounted upon said body, said member being adapted to contain water, an air-duct leading from said blower to a point above the surface of the water, a dividing partition within said member, curved elements also within said member providing an air-conveying duct upon one side of said partition, and a rotary dust-collecting screen upon the other side of said partition.

9. A dust-collector comprising a lower chambered body provided with an air-inlet, a blower within said body, a screening device in said body through which air is drawn, a tank-shaped member mounted upon said body, said member being adapted to contain water, an air-duct leading from said blower to a point above the surface of the water, a dividing partition within said member, curved elements also within said member providing an air-conveying duct upon one side of said partition, a rotary dust-collecting screen upon the other side of said partition, and a second stationary screen located above said rotary screen, substantially as and for the purposes set forth.

10. A dust-collector comprising a lower chambered body provided with an air-inlet, a blower within said body, a screening device in said body through which air is drawn, an upper cabinet mounted upon said body, said upper cabinet comprising a lower tank-shaped element, and an upper element, said upper element consisting of a fixed section and a second section hinged to said fixed section, said tank-shaped element being adapted to contain water, an air-duct leading from said blower to a point above the surface of the water, curved elements within said fixed section providing an air-conveying duct, and a dust-collecting screen located beneath said hinged section.

11. A dust-collector comprising a lower chambered body provided with an air-inlet, a blower within said body, a screening device in said body through which air is drawn, an upper cabinet mounted upon said body, said upper cabinet comprising a lower tank-shaped element, and an upper element, said upper element consisting of a fixed section and a second section hinged to said fixed section, said tank-shaped element being adapted to contain water, an air-duct leading from said blower to a point above the surface of the water, curved elements within said fixed section providing an air-conveying duct, and a rotary dust-collecting screen located beneath said hinged section.

12. A dust-collector comprising a lower chambered body provided with an air-inlet, a blower within said body, a screening device in said body through which air is drawn, an upper cabinet mounted upon said body, said upper cabinet comprising a lower tank-shaped element, and an upper element, said upper element consisting of a fixed section and a second section hinged to said fixed section, said tank-shaped element being adapted to contain water, an air-duct leading from said blower to a point above the surface of the water, curved elements within said fixed section providing an air-conveying duct, and a rotary dust-collecting screen located beneath said hinged section, and a second stationary screen located above said rotary screen, substantially as and for the purposes set forth.

In testimony, that I claim the invention set forth above I have hereunto set my hand this 6th day of June, 1908.

CARL WINKLER.

Witnesses:
FREDK. C. FRAENTZEL,
ANNA H. ALTER.